WORTH & FINLAY.
Corn Planter.
No. 26,455.
Patented Dec. 13, 1859.
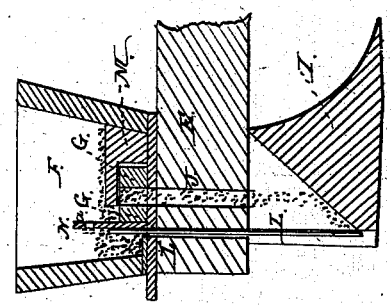
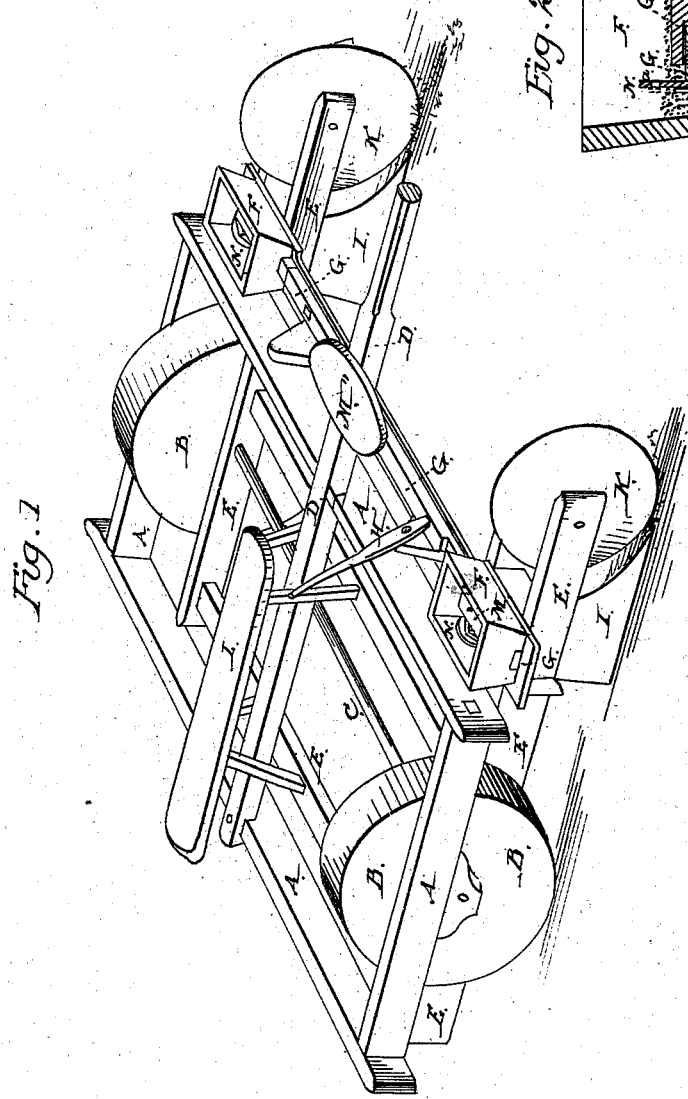
Witnesses:
S. A. McKew
Chas. Soward
Inventors:
William H. Worth
Leonard Finlay

UNITED STATES PATENT OFFICE.

WM. H. WORTH AND LEONARD FINLAY, OF CANTON, MISSOURI.

IMPROVEMENT IN SEED-PLANTERS.

Specification forming part of Letters Patent No. 26,455, dated December 1', 1859.

*To all whom it may concern:*

Be it known that we, WILLIAM H. WORTH and LEONARD FINLAY, both of Canton, in the county of Lewis and State of Missouri, have invented certain new and useful Improvements in Corn-Planters; and we do hereby declare that the following is a full, clear, and exact description of the same, reference being had to the accompanying drawings, and to the letters of reference marked thereon, in which—

Figure 1 represents a perspective view of the corn-planter, showing the several parts constituting our invention. Fig. 2 is a sectional view, showing the device for dropping the seed.

Similar letters of reference indicate like parts in both figures.

A represents a frame mounted upon wheels B B, the axle of which extends across the frame, the wheels being placed on the inside of the frame A.

D represents the draft-pole, which is fixed to the frame A, and may extend across it, as shown by the drawings. Within this frame, and between the wheels B B, is a secondary frame, E, which is hung on the axle C, so as to be allowed a free vertical play independent of the frame A. The frame E supports the driver's seat, and carries on its forward end the seed-planting arrangement, which, by allowing it the vertical motion above mentioned, will accommodate itself to the unevenness of the ground, and at the same time can be raised clear from the ground by the driver, as hereinafter described. The frame E extends out in front and on either side of the wheels, and carries two seed-hoppers, F F, through which passes laterally a seed-slide, G, to be operated by a hand-lever, H, so as to deposit the seed in the hollow shoes I I in the following manner: The corn is placed in the hoppers F F, as shown by Fig. 2 of the drawings, and motion given to the slide.

In each end of the lever and those portions which play in the hoppers are two holes for measuring the number of grains to be deposited. These alternately receive their charge and pass over the tube J, where it falls down upon an inclined surface of the shoes I I and against a gate, L, which prevents it from immediately leaving the shoe. The scrapers M serve to shut off the seed from the seed-cups when they pass over the depositing-tube J.

A plate, N, is fixed to the seed-slide G, having a right-angular or curved slot, *a*, (shown by Fig. 1,) which receives a pin projecting from the end of the vertical gate L, and as the slide G moves back and forth, the gates receive a vertical motion and deposit the seed previously dropped in the shoe into the drill. When the seed-cups are over the tubes dropping the seed into the shoes I I, the slotted plate N is so arranged that the gate will be closed, and when a seed-cup leaves the tube the gate is raised, and so on the operation continues, the gate being alternately raised when the seed-tube is closed and closed when the seed-tube is open. In this manner the seed is dropped into the drill from the heel of the shoe, the dropping taking place immediately the gate is raised.

In front of the shoes I I, and hung upon frame E, are rotary cutters or colters K K, which swell out toward their axes like two cones placed together. These precede the shoes and assist materially in preparing the ground for the reception of the seed. After the seed has been deposited the wheels B act as coverers, at the same time pressing the earth around the seed. L is the driver's seat placed upon the frame E, so that the driver sits astride of it. The seat projects out behind a sufficient distance, so that when he desires to raise the front end of the frame by moving to the rear part of the seat his weight will be sufficient to raise and keep the front end of the frame elevated while the machine is turning round.

M' is a seat placed upon the tongue D for the person who attends to the dropping of the corn.

What we claim as new, and desire to secure by Letters Patent, is—

The arrangement of the longitudinally-moving slotted plate N, vertical gate L, sliding bar G, operating-lever H, shoes I, and rotary colters K, as and for the purpose herein shown and described.

WILLIAM H. WORTH.
LEONARD FINLAY.

Witnesses:
S. H. McKIM,
CHAS. SOWARD.